United States Patent [19]

Shimoda et al.

[11] Patent Number: 5,705,632

[45] Date of Patent: *Jan. 6, 1998

[54] PROCESS FOR THE PREPARATION OF CELLULOSE ACETATE FILM

[75] Inventors: Kazuhiro Shimoda; Masahiko Murayama; Hidekazu Yamazaki, all of Kanagawa; Tohru Shibata, Hyogo; Shu Shimamoto, Hyogo; Hiroyuki Takemoto, Hyogo; Naoto Habu, Hyogo, all of Japan

[73] Assignees: Fuji Photo Film Co., Ltd., Kanagawa; Daicel Chemical Industries, Ltd., Osaka, both of Japan

[*] Notice: The term of this patent shall not extend beyond the expiration date of Pat. No. 5,663,310.

[21] Appl. No.: 582,355

[22] Filed: Jan. 19, 1996

[30] Foreign Application Priority Data

Jan. 19, 1995 [JP] Japan ................................. 7-006682

[51] Int. Cl.$^6$ ........................................................ C08J 3/11
[52] U.S. Cl. ................................................. 536/69; 536/76
[58] Field of Search ................................. 536/69, 70, 71, 536/72, 73, 74, 75, 76

[56] References Cited

FOREIGN PATENT DOCUMENTS 2 221 421   2/1990   United Kingdom .

OTHER PUBLICATIONS

Database WPI, Section Ch, Week 8713, Derwent Publications Ltd., Feb. 18, 1987, Abstract of JP-A-62 037 113.
Die Makromolekulare Chemie, J.M.G. Cowie et al., The Dissolution and Stability of Cellulose . . . , vol. 143, No. 3516, 1971, pp. 105–114.
K. Kamide et al., Textile Machinery Society, Dry Spinning of Cellulose . . . vol. 34, pp. 57–61, 1981.

*Primary Examiner*—Nathan M. Nutter

[57] ABSTRACT

A process for the preparation of a cellulose acetate film comprises the steps of: cooling a mixture of cellulose acetate and an organic solvent to −100° to −10° C.; warming the cooled mixture to 0° to 50° C. to dissolve the cellulose acetate in the organic solvent; casting the obtained solution on a support; and evaporating the organic solvent to form the cellulose acetate film. The cellulose acetate has an average acetic acid content in the range of 58.0 to 62.5%. The organic solvent is acetone.

8 Claims, 2 Drawing Sheets

PROCESS FOR THE PREPARATION OF CELLULOSE ACETATE FILM

FIELD OF THE INVENTION

The present invention relates to a process for the preparation of a cellulose acetate film. The invention particularly relates to a process for the preparation of a cellulose acetate film that is favorably used as a color filter or a support of a photographic material.

BACKGROUND OF THE INVENTION

A cellulose acetate film is used in various photographic or optical elements because it has tough and enough flame retardant properties. The cellulose acetate film is a representative photographic support. Further, the cellulose acetate film has an optical isotropy. Accordingly, the film is also used in a liquid crystal display device, which has recently extended its market. The cellulose acetate film is used as a protective film of a polarizing plate or a color filter in the liquid crystal display device.

The acetic acid content and the polymerization degree (which has a correlation with the viscosity) of cellulose acetate influence the mechanical strength and the durability of a film obtained from the cellulose acetate. The elasticity, folding endurance, dimensional stability and resistance to moisture and heat decrease with decreasing the acetic acid content and the polymerization degree. An acetic acid content of 58% or more (preferably 59% or more) is necessary to satisfy the required quality of the photographic support or the optical film. The cellulose acetate having an acetic acid content of 58% or more is referred to as triacetyl cellulose (TAC). With respect to the polymerization degree, cellulose acetate preferably has a viscosity average degree of polymerization of not less than 270, and more preferably of not less than 290.

A cellulose acetate film is prepared according to a solvent cast method or a melt cast method. The solvent cast method comprises the steps of casting a solution of cellulose acetate in a solvent (that is called "dope") on a support, and evaporating the solvent to form a film. The melt cast method comprises the steps of casting molten cellulose acetate on a support under heating, and cooling it to form a film. The solvent cast method can form a highly flat film, compared with the melt cast method. Therefore, the solvent cast method is generally employed to give a cellulose acetate film.

The solvent cast method is described in various documents. The recent object of the method is to shorten the period of time between casting the dope on the support and peeling the formed film off the support. If the time is shortened, the productivity of the film formation is improved. For example, Japanese Patent Publication No. 5(1993)-17844 discloses a process of casting a concentrated dope on a cooled drum to shorten the period of time between the casting step and the peeling step.

The solvent used in the solvent cast method must function not only for dissolving the cellulose acetate but also of forming an excellent film. In more detail, the viscosity and the polymer concentration of the solution (dope) should be appropriately adjusted to form a flat plane film having a uniform thickness. The dope also should have enough stability. Further, the dope should easily be set to gel. Furthermore, the formed film should easily be peeled off the support. The most appropriate solvent must be selected to satisfy these requirements. Moreover, the solvent should be so easily evaporated that the solvent scarcely can remain in the film.

Various organic solvents have been proposed as the solvents of cellulose acetate. However, only methylene chloride satisfies all of the above-mentioned requirements. Accordingly, solvents other than methylene chloride have not been practically used.

Examples of the known organic solvents of cellulose acetate include epichlorohydrin (boiling point (b.p.): 116° C.), N-methylpyrrolidone (b.p.: 202° C.), tetrahydrofuran (b.p.: 65.4° C.), 1,4-dioxane (b.p.: 101° C.), 1,3-dioxolane (b.p.: 75° C.), and nitromethane (b.p.: 101° C.). These solvents have high boiling points compared with methylene chloride (b.p.: 41° C.). Therefore, a process of evaporating the solvent other than methylene chloride needs a relatively large thermal energy.

Methylene chloride is an excellent organic solvent, and is free from the above-mentioned problems.

However, the use of hydrocarbon halides such as methylene chloride has recently been restricted severely to protect the global environmental conditions. Further, methylene chloride is apt to vaporize in the process for the preparation of the film, because it has a low boiling point (41° C.). Accordingly, methylene chloride may cause problems in the working environment. Therefore, the process is conducted under closed conditions. However, there is a technical limitation on sealing methylene chloride in a closed system. Accordingly, it is an urgent necessity to search for a new solvent for the cellulose acetate, namely replacement of methylene chloride.

By the way, acetone is a widely used organic solvent. Acetone has an appropriate boiling point (56° C.). The process of evaporating acetone does not need a large thermal energy. Further, acetone has few problems on the human body and the global environmental conditions, compared with the organic chloride solvents.

However, cellulose acetate has a poor solubility in acetone. Cellulose acetate having a degree of substitution of not more than 2.70 (acetic acid content: 58.8%) is slightly soluble in acetone. The solubility decreases with increasing the substitution degree. Cellulose acetate having the substitution degree of not less than 2.80 (acetic acid content: 60.1%) is not soluble in acetone, and is merely swelled in acetone.

J. M. G. Cowie et al. report in Makromol., Chem., 143 (1971) 105–114, that cellulose acetate having a substitution degree in the range of 2.70 (acetic acid content: 60.1%) to 2.80 (acetic acid content: 61.3%) is dissolved in acetone by a specific process. The process comprises the steps of cooling the cellulose acetate in acetone to a temperature of −80° to −70° C., and warming it to obtain 0.5 to 5 wt. % solution of the cellulose acetate in acetone. The method of cooling the mixture of cellulose acetate in acetone to obtain a solution is hereinafter referred to as a cooling dissolution method. The dilute (0.5 to 5 wt. %) solution reported in J. M. G. Cowie et al. is not appropriate for preparation of a cellulose acetate film. The dope for the preparation of the film requires a cellulose acetate concentration in the range of 10 to 30 wt. %.

The solution of cellulose acetate in acetone is also reported by K. Kamide et al., Textile Machinery Society, Vol. 34, 57–61 (1981). The report (written in Japanese) is entitled "Dry spinning process using acetone solution of triacetyl cellulose." In the report, the cooling dissolution method is applied to the art of fiber spinning. The experiments reported in the report examine the mechanical strength, the dyeing property and the sectioned shape of the fiber obtained by the cooling dissolution method. In the report, 10 to 25 wt. % solution of cellulose acetate is used to form a fiber. However, it is difficult appropriately to apply the contents of the report to a film formation because there is a large difference in the technical fields between the fiber spinning and the film formation.

SUMMARY OF THE INVENTION

An object of the present invention is to form an excellent cellulose acetate film without use of organic chloride solvents such as methylene chloride.

The present invention provides a process for the preparation of a cellulose acetate film which comprises the steps of:

- cooling a mixture of cellulose acetate and an organic solvent to a temperature of $-100°$ to $-10°$ C., said cellulose acetate having an average acetic acid content in the range of 58.0 to 62.5%, and said organic solvent consisting essentially of acetone;

- warming the cooled mixture to a temperature of $0°$ to $50°$ C. to dissolve the cellulose acetate in the organic solvent;

- casting the obtained solution on a support; and

- evaporating the organic solvent to form the cellulose acetate film.

The expression "organic solvent consisting essentially of acetone" means that the content of acetone in the organic solvent is not less than 95 wt. %.

DETAILED DESCRIPTION OF THE INVENTION

[Cellulose acetate]

Figure 1:
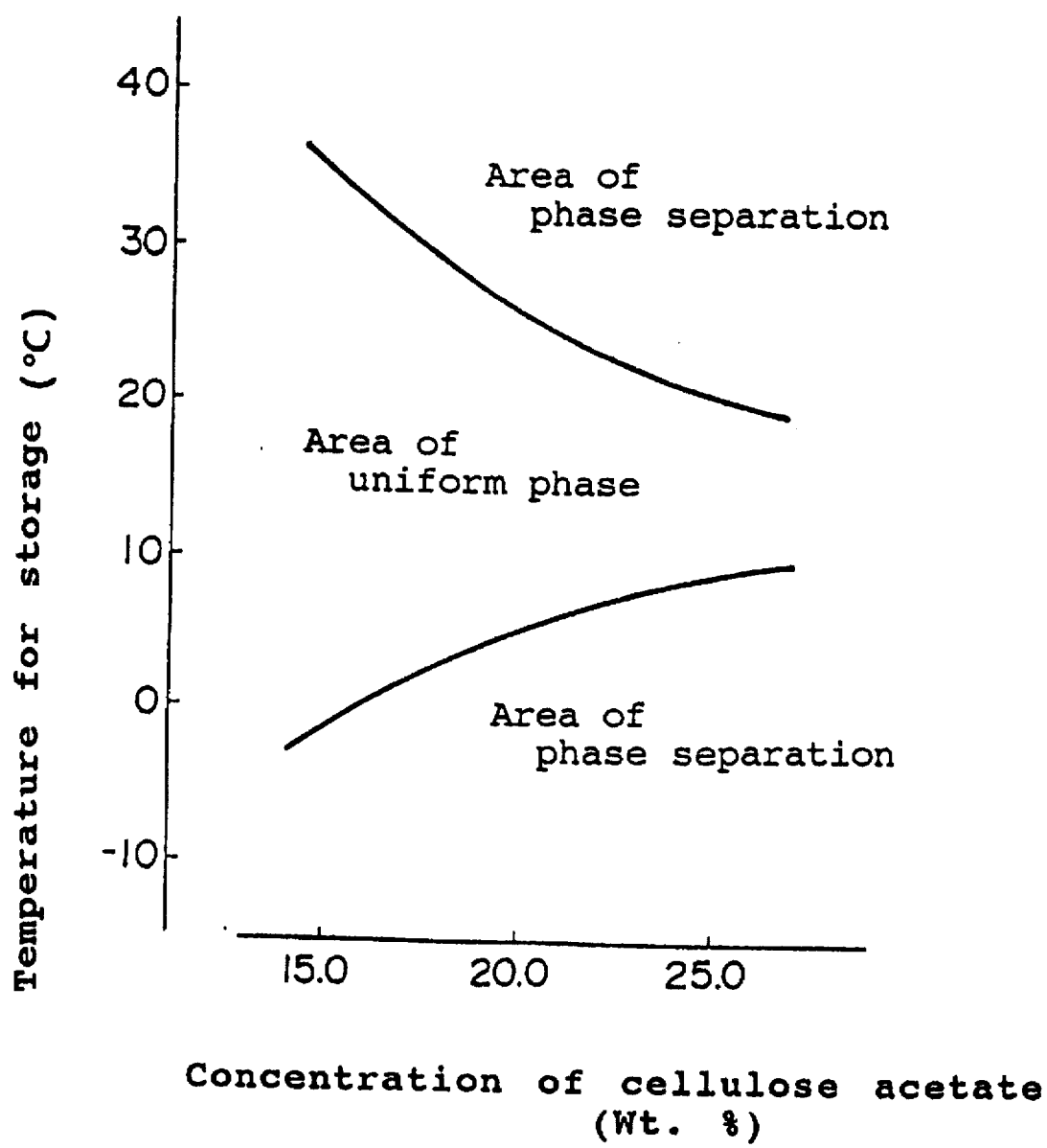
FIG. 1 is a graph showing the states of the dope of cellulose acetate in acetone prepared by the cooling dissolution method.

The cellulose acetate used in the present invention has an average acetic acid content in the range of 58.0 to 62.5%. The acetic acid content means a percent weight ratio of acetic acid moiety combined to cellulose. The acetic acid content is measured and calculated according to ASTM, D-817-91 (Testing methods for cellulose acetate etc.).

The range of 58.0 to 62.5% is necessary to satisfy the required quality of a photographic support or an optical film. Further, cellulose acetate having an average acetic acid content of not more than 58.0% can be dissolved in acetone without use of the cooling dissolution method of the present invention.

Cellulose acetate can be prepared from cotton linter or wood pulp. Cotton linter can be mixed with wood pulp. Wood pulp is rather inexpensive. However, the formed film can easily be peeled from the support when using the cotton linter only or a mixture of the linter and the wood pulp. Further, the film prepared from the cotton linter has a rather smooth surface even if the film is prepared within a short period of time.

Cellulose acetate is usually prepared by acetylation of cellulose using acetic acid, acetic anhydride and sulfuric acid. A methylene chloride method or a fiber acetylation method is adopted on an industrial scale. According to the methylene chloride method, acetylation is conducted in a methylene chloride solution. According to the fiber acetylation method, cellulose fiber is acetylated in a non-solvent (e.g., benzene, toluene) of cellulose.

Cellulose acetate preferably has a viscosity average degree of polymerization (DP) in the range of 250 to 400. The polymerization degree more preferably is not less than 290. If the polymerization degree is less than 250, the strength of the obtained film is poor. The viscosity average degree of polymerization is calculated from the inherent viscosity of cellulose acetate [η] according to the formula (1). The viscosity can be measured by an Ostwald viscometer.

$$DP=[\eta]/Km \qquad (1)$$

wherein [η] means the inherent viscosity of cellulose acetate; and Km is the constant of $6 \times 10^{-4}$.

In the case that the viscosity average degree of polymerization (DP) is not less than 290, cellulose acetate preferably has a relation of the formula (2) between the viscosity average degree of polymerization (DP) and a concentrated solution viscosity (η).

$$2.814 \times \ln(DP) - 11.753 \leq \ln(\eta) \leq 6.29 \times \ln(DP) - 31.469 \qquad (2)$$

wherein DP means the value of a viscosity average degree of polymerization, which is not less than 290; and η is the time (in terms of second) taken for a ball to pass between the standard lines measured according to a falling ball method.

The formula (2) is obtained by plotting the viscosity average degree of polymerization and the concentrated solution viscosity, which are obtained by the experimental results. The concentrated solution viscosity of cellulose acetate having a viscosity average degree of not less than 290 increases usually according to an exponential equation with increase of the degree. On the other hand, the formula (2) defines that the concentrated solution viscosity increases according to a primary equation with increasing the degree. Accordingly, the increase of the concentrated solution viscosity is preferably restricted to satisfy the formula (2) where cellulose acetate has a high viscosity average degree of polymerization.

Cellulose acetate preferably has a narrow molecular weight distribution in terms of Mw/Mn (wherein Mw means the weight average molecular weight, and Mn means the number average molecular weight). Mw and Mn can be measured by a gel permeation chromatography. The value of Mw/Mn is preferably in the range of 1.0 to 1.7, more preferably in the range of 1.3 to 1.65, and most preferably in the range of 1.4 to 1.6. In the case that Mw/Mn is more than 1.7, the viscosity of the dope so increases that the flatness of the film is degraded. On the other hand, it is difficult to prepare cellulose acetate having a value of Mw/Mn in the range of 1.0 to 1.4. Even if such cellulose acetate were obtained, the molecular weight would be extremely small. If a film is formed from such cellulose acetate, the mechanical properties of the film are inferior because of the small molecular weight.

Cellulose acetate preferably has a small value of a crystallization exotherm. The small crystallization exotherm means that the degree of crystallization is low. The crystallization exotherm (ΔHc) is preferably in the range of 5 to 17 J/g, more preferably in the range of 6 to 16 J/g, and most preferably in the range of 10 to 16 J/g. If the crystallization exotherm is more than 17 J/g, fine crystals are present in the formed film. The fine crystals decrease the solubility of cellulose acetate in acetone. Further, the obtained solution is not so stable that the fine crystals tend to be formed again.

Furthermore, the crystals degrade the handling and the optical properties of the film. If the crystallization exotherm is less than 5 J/g, the mechanical strength of the obtained film is insufficient. Further, it requires a relatively long period of time to set the dope to gel where the crystallization exotherm is small.

The low molecular weight fraction is preferably removed from cellulose acetate to satisfy the relation between the viscosity average degree of polymerization (DP) and the concentrated solution viscosity (η), the molecular weight distribution (Mw/Mn) and the crystallization exotherm (ΔHc).

If the low molecular weight fraction is sufficiently removed, the average molecular weight (polymerization degree) increases while the viscosity is relatively low compared with usual cellulose acetate. Accordingly, it is easy to satisfy the relation between DP and η. Further, the molecular weight distribution is made uniform by removing the low molecular weight fraction. The low molecular lower molecular weight fraction.

The amount of the low molecular weight fraction is preferably not more than 10 wt. %. The cellulose acetate having such a small amount of the fraction can be obtained by removing the fraction from conventional or commercially available cellulose acetate.

The low molecular weight fraction can be removed by washing cellulose acetate with an organic solvent. Examples of the organic solvents include ketones (e.g., acetone), acetic esters (e.g., methyl acetate) and cellosolves (e.g., methyl cellosolve). Ketones are preferred, and acetone is particularly preferred.

When conventional cellulose acetate is once washed with an organic solvent, a low molecular weight fraction is removed. The amount of the fraction is usually in the range of 10 to 15 wt. %. When the cellulose acetate is washed again, the amount of the remaining low molecular weight fraction (which is soluble in acetone at 25° C.) is usually made to not more than 10 wt. %. The low molecular weight fraction is easily removed where the amount of the fraction soluble in acetone is not more than 10 wt. %. Accordingly, the fraction can be sufficiently removed by only one washing process. The amount of the low molecular weight fraction which is soluble in acetone at 25° C. more preferably is not more than 5 wt. %

Before washing cellulose acetate, cellulose acetate particles are preferably ground and filtered to adjust the particle size. In more detail, the particle size is so adjusted that at least 70% of the particles pass through a sieve of 20 mesh.

The washing process can be conducted by a solvent cycling method, such as Soxhlet extraction method. Further, the process can be conducted by stirring cellulose acetate with a solvent in a conventional tank, and then separating the acetate from the solvent. At the first washing stage, the solvent tends to become viscous because a large amount of the low molecular weight fraction (10 to 15% of cellulose) is usually dissolved in the solvent. Therefore, the ratio of the cellulose acetate to the solvent is preferably not more than 10 wt. % to conduct the washing process.

Cellulose acetate having a small amount of low molecular weight fraction can be produced. At the acetylation reaction, the amount of sulfuric acid (catalyst) preferably is in the range of 10 to 15 weight parts based on 100 weight parts of cellulose acetate to decrease the amount of the fraction. If the amount of the sulfuric acid catalyst is adjusted within the above-mentioned range (relatively large amount), the produced cellulose acetate has a relatively uniform molecular weight distribution.

[Formation of dope (cooling dissolution method)]

In the present invention, cellulose acetate is dissolved in an organic solvent according to the cooling dissolution method to obtain a solution (dope). The organic solvent consists essentially of acetone. The content of acetone in the organic solvent is not less than 95 wt. %, preferably not less than 98 wt. %, and more preferably not less than 99 wt. %.

At the first stage of the dope formation, cellulose acetate is gradually added to acetone while stirring at room temperature. Cellulose acetate is swelled with acetone, but is not dissolved at this stage. The amount of cellulose acetate is in the range of 10 to 40 wt. %, based on the amount of the mixture. The amount is preferably in the range of 10 to 30 wt. %. The other optional additives (described below) may be added to acetone.

At the next stage, the mixture is cooled to a temperature of −100° to −10° C., preferably −80° to −10° C., more preferably −50° to −20° C., and most preferably −50° to −30° C. The mixture can be cooled in a dry ice/methanol bath (−75° C.) or in a cooled diethylene glycol solution (−30° to −20° C.). At the cooling stage, the mixture of cellulose acetate and acetone solidify.

Subsequently, the mixture is warmed to a temperature of 0° to 50° C. to dissolve the cellulose acetate in acetone. The mixture can be warmed by keeping it at room temperature. The mixture can also be warmed on a bath. Thus a dope is formed as a uniform solution. If cellulose acetate is not sufficiently dissolved, the cooling and warming steps can be repeated. The dope is observed with eyes to determine whether cellulose acetate is sufficiently dissolved or not.

A sealed vessel is preferably used in the cooling dissolution method to prevent contamination of water, which is caused by dew condensation at the cooling step. The time for the cooling and warming steps can be shortened by conducting the cooling step under a high pressure and conducting the warming step under a low pressure. A pressure vessel is preferably used under a high or low pressure.

The stability of the obtained dope is an important factor in the preparation of the film. Precipitation of insoluble must be avoided while sending the dope through a tube. Coagulation of the dope must also be avoided while the use of apparatus is stopped for inspection. The stability of the dope depends on the storage temperature and the concentration of the dope as well as the above-mentioned characteristics of cellulose acetate.

FIG. 1 is a graph showing the states of the dope of cellulose acetate (acetic acid content: 60.9%, viscosity average degree of polymerization: 299) in acetone prepared by the cooling dissolution method. The abscissa means the concentration of cellulose acetate in the dope. The ordinate means the temperature at which the dope is stored. As is shown in FIG. 1, there are two phase separation areas within the temperature of −10° to 30° C., at which the dope is usually stored. The phase separation area at the high temperature is of an LCST type, and the area at the low temperature is of a UCST type. The temperature of the uniform phase area shown in FIG. 1 should be kept to store the dope at a stable state. At the temperature without the uniform phase area, the dope forms a milky white solid because of phase separation.

The uniform phase area shown in FIG. 1 depends on the average acetic acid content of cellulose acetate, the viscosity average degree of polymerization and the concentration of the dope.

[Casting and drying]

The dope is cast on a support, and the solvent is evaporated to form a film. Before casting the dope, the concentration of the dope is so adjusted that the solid content of the dope is in the range of 18 to 35 wt. %. The surface of the support is preferably polished to give a mirror plane. A drum or a band is used as the support. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The support preferably has a surface temperature of not higher than 10° C. when the dope is cast on the support. After casting the dope, the dope is preferably dried with air for at least 2 seconds. The formed film is peeled off the support, and the film can be further dried with air to remove the solvent remaining in the film. The temperature of the air can be gradually elevated from 100° to 160° C. The above-mentioned method is described in Japanese Patent Publication No. 5(1993)-17844. According to the method, the time for casting and peeling steps can be shortened. The method requires that the dope be set to gel at the surface temperature of the support. The dope formed according to the present invention satisfies the requirement.

The cellulose acetate film has a thickness preferably in the range of 5 to 500 μm, more preferably in the range of 20 to 200 μm, and most preferably in the range of 60 to 120 μm.

[Other additives]

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP) and diethylhexyl phthalate (DEHP). Examples of the citric esters include o-acetyltriethyl citrate (OACTE) and o-acetyltributyl citrate (OACTB). Examples of the carboxylic esters include phthalic esters and citric esters. Examples of the other carboxylic esters include butyl oleate, methylacetyl ricinoleate, dibutyl sebacate and various trimellitic esters. Phthalic ester plasticizers (DMP, DEP, DBP, DOP, DEHP) are preferred. DEP is particularly preferred.

Further, a compound represented by the formula (I), (II) or (III) can be added to the film.

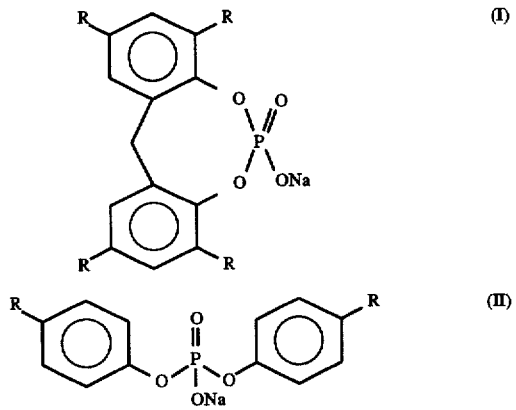

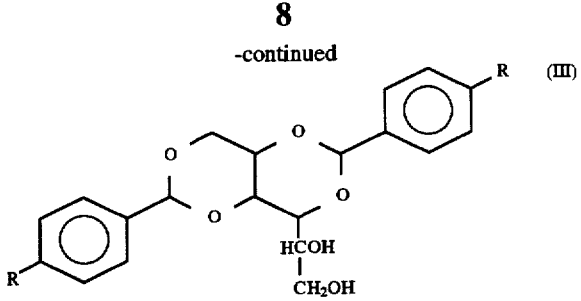

wherein R is an alkyl group having 1 to 4 carbon atoms.

The compounds of the formulas (I) to (III) are known as crystal nucleus forming agents (nucleus agents). The agents are used to improve optical, mechanical, thermal or molding characteristics of a crystalline polymer (e.g., polypropylene) when the polymer is melt and molded.

In the present invention, the compounds of the formulas (I) to (III) are not used as the crystal nucleus forming agents, but are used to increase the gel point of the dope. The compounds have an affinity with cellulose acetate because they have amphiphatic chemical structures. Further, the compounds have a function of aggregate themselves. Accordingly, the compounds accelerate the aggregation of cellulose acetate to increase the gel point of the dope.

The compounds of the formulas (I) to (III) have another function of decreasing the viscosity of the dope. The compounds inhibit solvation between acetone and hydroxyl of cellulose acetate to restrict diffusion of the polymer.

Examples of the compounds of the formulas (I) to (III) include 2,2'-methylenebis(4,6-di-t-butylphenyl) sodium phosphate (Adecastab NA-11, product of Asahi Electro-Chemical Co., Ltd.), bis(4-t-butylphenyl) sodium phosphate (Adecastab NA-10, product of Asahi Electro-Chemical Co., Ltd.), bis(p-methylbenzilidene)sorbitol (Gelol MD, product of New Japan Rika Co., Ltd.) and bis(p-ethylvindilidene)-sorbitol (NC-4, product of Mitsui Toatsu Chemicals, Inc.).

Deterioration inhibitors (e.g., peroxide decomposer, radical inhibitor, metal inactivating agent, oxygen scavenger) or ultraviolet inhibitors can be incorporated into the cellulose acetate film. The deterioration inhibitors are described in Japanese Patent Provisional Publication No. 5(1993)-197073. The ultraviolet inhibitors are described in Japanese Patent Provisional Publication No. 7(1995)-11056.

In the Examples, the chemical and physical characteristics of the cellulose acetate, the dope and the film are measured and calculated in the following manner.

(1) Acetic acid content (%) of cellulose acetate

The acetic acid content was measured according to a saponification method. Cellulose acetate was dried and weighed exactly, and was dissolved in a mixture of acetone and dimethylsulfoxide (volume ratio: 4:1). A predetermined amount of 1N sodium hydroxide solution was added to the solution. The mixture was saponified at 25° C. for 2 hours. Phenolphthalein (indicator) was added to the solution. Excess sodium hydroxide was tittered with 1N sulfuric acid (concentration factor: F). Further, a blank test was conducted in the same manner. The acetic acid content was calculated according to the following formula:

Acetic acid content (%)=(6.005×(B−A)×F)/W wherein A is the amount of 1N sulfuric acid (ml) required for titration of the sample; B is the amount of 1N sulfuric acid (ml) required for the blank test, F is the factor of 1N sulfuric acid; and W is the weight of the sample.

(2) Average molecular weight and molecular weight distribution of cellulose acetate The molecular weight was measured by using a high speed liquid chromatography system (GPC-LALLS). In the system, a detector for refractive index and light scattering was attached to a gel permeation column. The conditions for measurement are shown below.

Solvent: methylene chloride

Column: GMH×1 (Toso Ltd.)

Concentration of sample: 0.1 w./v. %

Flow rate: 1 mn/min

Amount of injected sample: 300 μl

Standard sample: Polymethyl methacrylate (Mw: 188,200)

Temperature: 23° C.

(3) Viscosity average degree of polymerization of cellulose acetate (DP)

About 0.2 g of completely dried cellulose acetate was weighed exactly, and dissolved in 100 ml of a mixture of methylene chloride and ethanol (weight ratio: 9:1). The solution was examined by an Ostwald viscometer. The degree of polymerization was calculated by the following formulas:

$$\eta_{rel} = T/T_0$$

$$[\eta] = (\ln \eta_{rel})/C$$

$$DP = [\eta]/Km$$

wherein T is the time (second) taken for the sample to pass between standard lines; $T_0$ is the time (second) taken for the solvent only; C is the concentration (g/l); and Km is the constant of $6 \times 10^{-4}$.

(4) Concentrated solution viscosity (η) of cellulose acetate

Cellulose acetate was dissolved in a mixture of methylene chloride and methanol (weight ratio: 8:2) to prepare 15 wt. % solution. The solution was injected into a viscosity tube having the internal diameter of 2.6 cm. The sample was conditioned to 25° C. A hard ball (diameter: 3.15 mm, weight: 0.135 g) was dropped into the solution. The viscosity was measured as the time (second) taken for a ball to pass between two standard lines (distance: 10 cm).

(5) Crystallization exotherm (ΔHc) of cellulose acetate

Cellulose acetate was dissolved in a mixture of methylene chloride and ethanol (weight ratio: 9:1) to prepare 15 wt. % dope. The dope was filtered over a non-woven fabric under pressure, and was cast on a smooth glass plate using a bar coater. The formed film was dried with air for one day, and peeled off the glass plate. The film was further dried under vacuum at 80° C. for 4 hours. In a standard aluminum pan, 10 mg of the obtained film sample was placed. The pan was further placed on a sample table of a thermal compensation type differential scanning calorimeter (DSC). The sample was left for a short time at the temperature of the melting point. The melt sample was cooled to the room temperature at the cooling rate of 4° C. per 1 minute to crystallize the sample.

The crystallization exotherm (ΔHc) was obtained from the area of the exotherm peak in the measured DSC curve. The DSC measurement was conducted in an atmosphere of nitrogen. The temperature was calibrated at the two points of In (melting point: 156.60° C.) and Sn (melting point: 231.88° C.). The calorie was calibrated at the point of In (heat of melt: 28.45 J/g). The crystallization temperature was analyzed according to JIS-K-7121 (1987). The heat of crystallization was analyzed according to JIS-K-7122 (1987).

(6) Ratio of acetone extracted fraction (%) of cellulose acetate.

The weight of cellulose acetate (A) was measured. The cellulose acetate was stirred in acetone (amount: 10×A) at room temperature for 30 minutes. The mixture was filtered under pressure. The filtrate was dried to measure the weight of the solid content (B). The ratio of the fraction extracted with acetone was calculated according to the following formula:

Acetone extracted fraction (%)=(B/A)×100

(7) Viscosity and gelation of dope

The gelation was observed using a viscometer (HAAKE). The turning point of the coefficient A in the following Andrade's equation. The gelation was determined by the turning point and the attained viscosity.

Rotor: sv-DIN

Shearing rate: 0.1 (1/sec)

Cooling rate: 0.5° C./min $$\eta = A \exp(B/T)$$

wherein T is the temperature at the measurement; and each of A and B is a constant determined by the conditions of the polymer. The gelation is determined whether the coefficient A has a turning point (shown in a graph of viscosity and temperature) or not.

(8) Equilibrium water content of film

A film was placed at 25° C. and the relative humidity of 60% for 24 hours. The amount of water of equilibrium water contained in the sample was measured by a Karl-Fischer method. The amount of water (g) was divided by the amount of the sample to calculate the equilibrium water content.

The measurement was conducted by using a water content analyzer (CA-03, product of Mitsubishi Chemical Co., Ltd.), a drying device (VA-05, product of Mitsubishi Chemical Co., Ltd.) and Karl-Fischer agents (AKS and CKS, product of Mitsubishi Chemical Co., Ltd.).

(9) Tensile test of film

A sample (length: 100 mm, width: 10 mm) was tested according to ISO-1184-1983. The modulus of elasticity and the breaking extension were measured under conditions that the first sample length was 50 mm and the extending rate was 20 mm/min.

(10) Tear test of film

A sample (50 mm×64 mm) was tested according to ISO-6383/2-1983 to determine the weight for tearing the sample.

(11) Folding endurance test of film

A sample of 120 mm was tested according to ISO-8776/2-1988 to determine the folding times for breaking the sample.

(12) Resistance to moisture-heat of film

In a glass bottle of 15 ml, 1 g of a folded sample was placed. The sample was conditioned at 90° C. and the relative humidity of 100%. The bottle was sealed and placed at 90° C. for 200 hours. The sample was observed and classified into the following two grades:

A: No change was observed.

B: Smell of decomposition or a change of shape caused by decomposition was noted.

(13) Retardation (Re) of film

The front retardation was measured by an ellipsometer (AEP-100, product of Shimadzu Seisakusho, Ltd.). The wave-length was 632.8 nm. The measurement was conducted in the direction perpendicular to the surface of the film.

(14) Haze of film

Haze was measured by a haze meter (1001DP type, product of Nippon Denshoku Co., Ltd.)

EXAMPLE 1

At room temperature, 100 weight parts of cellulose acetate (average acetic acid content: 60.9%, viscosity average degree of polymerization: 299) were mixed with 400 weight parts of acetone. The ratio of cellulose acetate in the mixture was 20 wt. %. Cellulose acetate was not dissolved, but was swelled in acetone at room temperature. The swelled mixture was in the form of slurry.

The swelled mixture was placed in a jacketed vessel. The mixture was slowly stirred while pouring a mixture of dry ice and methanol (cooling medium) into the outer jacket. The temperature of the cooling medium was about $-78.5°$ C. (melting temperature of carbon dioxide). Thus, the mixture placed in the inner vessel was cooled to $-70°$ C. The mixture was uniformly cooled to complete gelation (30 minutes).

The cooling medium in the outer jacket was removed from the vessel, and warmed water was poured into the jacket. After the mixture was melt to some extent, the mixture was were stirred. Thus, the mixture was warmed to room temperature for 30 minutes.

The cooling and warming steps were repeated again.

The obtained dope was observed. Cellulose acetate was completely dissolved in acetone to obtain a uniform dope.

Gelation of the dope was determined by the method (7). As a result, gelation was observed at a low temperature.

The dope was cast on a band using a band casting machine (effective length: 6 m). The dry thickness of the formed film was 100 μm. The temperature of the band was $0°$ C. The film was dried with air for 2 seconds, and peeled off the band. The film was further gradually dried at $100°$ C. for 3 minutes, at $130°$ C. for 5 minutes and at $160°$ C. for 5 minutes to evaporate the remaining solvent, while fixing the end of the film. Thus a cellulose acetate film was prepared.

EXAMPLE 2

A dope was prepared in the same manner as in Example 1, except that the ratio of cellulose acetate in the mixture was 25 wt. %.

The obtained dope was observed. Cellulose acetate was completely dissolved in acetone to obtain a uniform dope. Further, gelation was observed at a low temperature.

The dope was cast and dried in the same manner as in Example 1 to prepare a cellulose acetate film.

EXAMPLE 3

A dope was prepared in the same manner as in Example 1, except that another cellulose acetate (average acetic acid content: 60.2%, viscosity average degree of polymerization: 323) was used and water/ethylene glycol was used as the cooling medium ($-30°$ C.).

The obtained dope was observed. Cellulose acetate was completely dissolved in acetone to obtain a uniform dope. Further, gelation was observed at a low temperature.

The dope was cast and dried in the same manner as in Example 1 to prepare a cellulose acetate film.

EXAMPLE 4

A dope was prepared in the same manner as in Example 1, except that another cellulose acetate (average acetic acid content: 59.5%, viscosity average degree of polymerization: 395) was used and water/ethylene glycol was used as the cooling medium ($-20°$ C.).

The obtained dope was observed. Cellulose acetate was completely dissolved in acetone to obtain a uniform dope. Further, gelation was observed at a low temperature.

The dope was cast and dried in the same manner as in Example 1 to prepare a cellulose acetate film.

COMPARISON EXAMPLE 1

A mixture was prepared in the same manner as in Example 1, except that the ratio of cellulose acetate in the mixture was 45.5 wt. %.

The cooling and warming steps were repeated several times. However, cellulose acetate could not be completely dissolved in acetone.

COMPARISON EXAMPLE 2

At room temperature ($20°$ C.), cellulose acetate (average acetic acid content: 60.9%, viscosity average degree of polymerization: 299) were mixed with acetone to prepare 20 wt. % mixture of cellulose acetate. The swelled mixture was in the form of slurry.

The swelled mixture was placed in a jacketed vessel used in Example 1. The mixture was slowly stirred while pouring water at room temperature ($20°$ C.). The mixture in the inner vessel was stirred for 30 minutes. The swelled mixture was not dissolved, and was still in the form of slurry. The stirring process for 30 minutes was repeated for several times. However, the swelled mixture was not dissolved, and was still in the form of slurry.

COMPARISON EXAMPLE 3

The procedures in Comparison Example 2 were repeated, except that another cellulose acetate (average acetic acid content: 60.2%, viscosity average degree of polymerization: 323) was used. As a result, cellulose acetate was not dissolved, but swelled in acetone.

COMPARISON EXAMPLE 4

The procedures in Comparison Example 2 were repeated, except that another cellulose acetate (average acetic acid content: 59.5%, viscosity average degree of polymerization: 395) was used. As a result, cellulose acetate was not dissolved, but swelled in acetone.

COMPARISON EXAMPLE 5

The procedures in Comparison Example 2 were repeated, except that another cellulose acetate (average acetic acid content: 57.0%, viscosity average degree of polymerization: 280) was used. As a result, cellulose acetate was dissolved in acetone at room temperature.

Gelation of the obtained dope was determined by the method (7). As a result, gelation was not observed at a low temperature.

The dope was cast on a band in the same manner as in Example 1. The film was peeled from the band after the film was completely dried because the dope was not set at the low temperature ($0°$ C.). Further, the film was shrunk only along the direction of the thickness because the film was placed on the band while drying the film. Accordingly, obtained film was rather stretched along the plane directions. The mechanical strength of the film was insufficient, and the film was easily torn.

The results of Examples 1 to 4 and Comparison Examples 1 to 5 are shown in Table 1.

As is shown in Table 1, cellulose acetate was dissolved in acetone according to the cooling dissolution method in Examples 1 and 2. However, 45.5 wt. % mixture (Comparison Example 1) was not dissolved. Cellulose acetate used in Examples 1 to 4 was not dissolved in acetone at room temperature (Comparison Examples 2 to 5). Cellulose acetate having the average acetic acid content of 57.0% was dissolved in acetone at room temperature (Comparison Example 5). However, gelation of the obtained dope was not observed at a low temperature, and the formed film had some problems.

In Table 1, the solubility indicates whether cellulose acetate was dissolved in acetone (+) or not (−). The gelation indicates whether the gelation was observed at 0° C. (+) or not (−).

TABLE 1

| Sample | Cellulose acetate | | | | Solu- | Gella- |
| No. | (A) | (B) | (C) | Temp. | bility | tion |
| --- | --- | --- | --- | --- | --- | --- |
| Example 1 | 60.9 | 299 | 20 wt. % | −70° C. | + | + |
| Example 2 | 60.9 | 299 | 25 wt. % | −70° C. | + | + |
| Example 3 | 60.2 | 323 | 20 wt. % | −30° C. | + | + |
| Example 4 | 59.5 | 395 | 20 wt. % | −20° C. | + | + |
| Comp. Ex. 1 | 60.9 | 299 | 45.5 wt. % | −70° C. | − | |
| Comp. Ex. 2 | 60.9 | 299 | 20 wt. % | 20° C. | − | |
| Comp. Ex. 3 | 60.2 | 323 | 20 wt. % | 20° C. | − | |
| Comp. Ex. 4 | 59.5 | 395 | 20 wt. % | 20° C. | − | |
| Comp. Ex. 5 | 57.0 | 280 | 20 wt. % | 20° C. | + | − |

Figure 2:
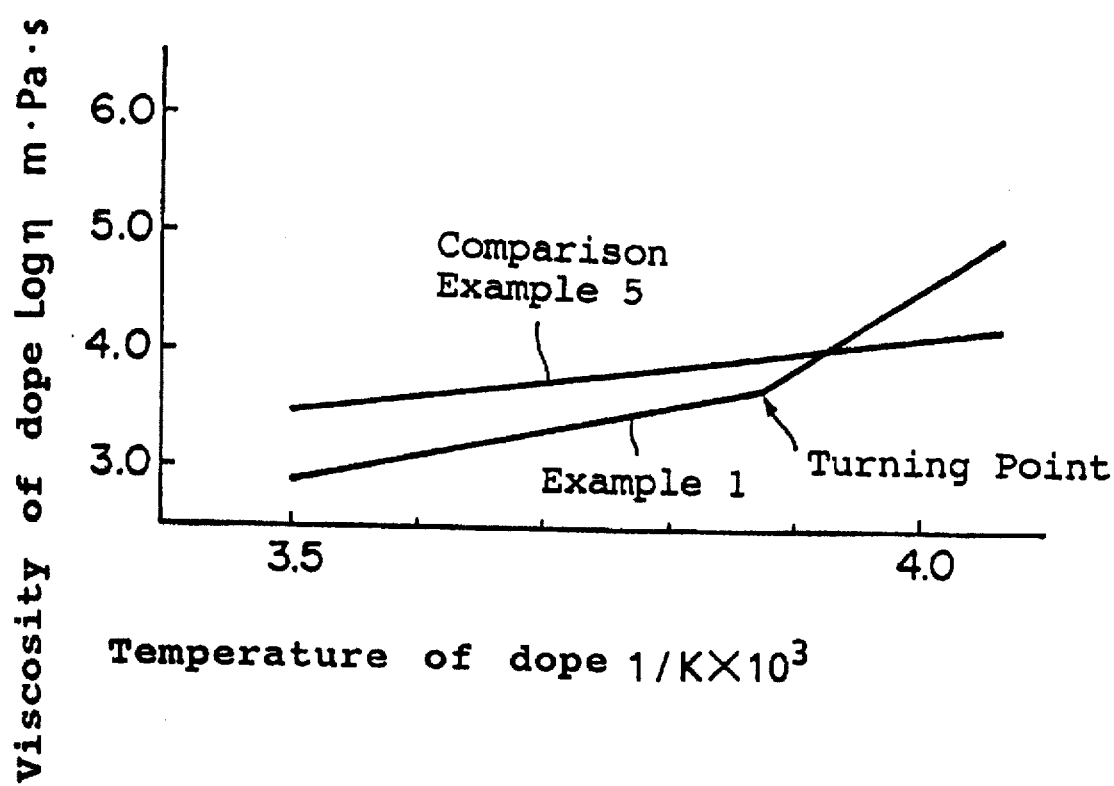
FIG. 2 is a graph showing the relation between the temperature of the dope ($1/K \times 10^3$) and the viscosity of the dope (Log η).

(Remark)
A: Acetic acid content
B: Degree of polymerization
C: Amount of cellulose acetate
Temp.: Temperature at the dissolving process FIG. 2 is a graph showing the relation between the temperature of the dope ($1/K \times 10^3$) and the viscosity of the dope (Log η) with respect to Example 1 and Comparison Example 5. The values were measured according to the method (7).

As is shown in FIG. 2, the graph of the dope obtained in Example 1 has a turning point, which means that the dope has a clear gelation point.

EXAMPLE 5

At room temperature, 100 weight parts of cellulose acetate (average acetic acid content: 60.9%, viscosity average degree of polymerization: 299) was mixed with 375 weight parts of acetone and 15 weight parts of diethyl phthalate (DEP).

The mixture was treated using water/ethylene glycol as the cooling medium (−30° C.) according to the cooling dissolution method in the same manner as in Example 3 to prepare a dope.

The viscosity and the gelation temperature were measured according to the method (7). The viscosity was 240 Pas (25° C.) and the gelation temperature was −12° C.

The dope was cast and dried in the same manner as in Example 1 to prepare a cellulose acetate film.

EXAMPLE 6

At room temperature, 100 weight parts of cellulose acetate (average acetic acid content: 60.9%, viscosity average degree of polymerization: 299) was mixed with 385 weight parts of acetone, 15 weight parts of diethyl phthalate (DEP) and 0.4 weight part of 2,2'-methylenebis(4,6-di-t-butylphenyl) sodium phosphate (Adecastab NA-11, Asahi Electro-Chemical Co., Ltd.).

The mixture was treated using water/ethylene glycol as the cooling medium (−30° C.) according to the cooling dissolution method in the same manner as in Example 3 to prepare a dope.

The viscosity and the gelation temperature were measured according to the method (7). The viscosity was 100 Pas (25° C.) and the gelation temperature was −9° C.

The dope was cast and dried in the same manner as in Example 1 to prepare a cellulose acetate film.

The results of Examples 5 and 6 are shown in Table 2.

As is shown in Table 2, 2,2'-methylenebis(4,6-di-t-butylphenyl) sodium phosphate (NA-11) has functions of increasing the gelation temperature and decreasing the viscosity of the dope.

TABLE 2

| Sample | Composition of dope (wt. part) | | | | Viscosity | Gel. |
| No. | CA | Acetone | DEP | NA-11 | Pas (25° C.) | Temp. |
| --- | --- | --- | --- | --- | --- | --- |
| Ex. 5 | 100 | 385 | 15 | — | 240 | −12° C. |
| Ex. 6 | 100 | 375 | 15 | 0.4 | 100 | −9° C. |

(Remark)
CA: Cellulose acetate (average acetic acid content: 60.9%, viscosity average degree of polymerization: 299)

(Evaluation of film)

The cellulose acetate films prepared in Examples 1 and 6 were subjected to the testing methods of (8) equilibration water content, (9) tensile test, (10) tear test, (11) folding endurance test, (12) resistance to moist heat, (13) retardation (Re) and (14) haze.

The results are set forth in Table 3.

As is shown in Table 3, the cellulose acetate films prepared according to the present invention have excellent physical and chemical characteristics.

TABLE 3

| Sample No. | (8) % | (9) kg/mm² | (10) kg | (11) Times | (12) | (13) nm | (14) % |
| --- | --- | --- | --- | --- | --- | --- | --- |
| Ex. 1 | 3.0 | 280 | 21 | 140 | A | 15 | 2.0 |
| Ex. 6 | 1.7 | 285 | 25 | 160 | A | 10 | 2.0 |

EXAMPLE 7

Cellulose acetate used in Example 1 (average acetic acid content: 60.9%, viscosity average degree of polymerization: 299) was stirred in acetone at room temperature for 30 minutes. The amount of acetone was ten times as large as the amount of cellulose acetate. Cellulose acetate was extracted from acetone and dried.

Thus, cellulose acetate (average acetic acid content: 60.9%, viscosity average degree of polymerization: 322) was obtained by removing a low molecular weight fraction. A dope was formed according to the cooling dissolution method in the same manner as in Example 1, except that the obtained cellulose acetate was used and that the ratio of cellulose acetate in the mixture was 22.5 wt. %.

Further, a cellulose acetate film was formed from the obtained dope in the same manner as in Example 1.

EXAMPLE 8

According to a conventional method, 100 weight parts of cellulose was esterified and hydrolyzed by using 11.7 weight parts of sulfuric acid, 260 weight parts of acetic anhydride and 450 weight parts of acetic acid to synthesize cellulose acetate (average acetic acid content: 60.2%, viscosity average degree of polymerization: 312).

Thus, cellulose acetate containing a small amount of a low molecular weight fraction was synthesized. A dope was formed according to the cooling dissolution method in the same manner as in Example 1, except that the obtained cellulose acetate was used and that the ratio of cellulose acetate in the mixture was 22.5 wt. %.

Further, a cellulose acetate film was formed from the obtained dope in the same manner as in Example 1.

EXAMPLE 9

A dope was formed according to the cooling dissolution method in the same manner as in Example 1, except that another cellulose acetate (average acetic acid content: 61.7%, viscosity average degree of polymerization: 291) was used and that the ratio of cellulose acetate in the mixture was 22.5 wt. %.

Further, a cellulose acetate film was formed from the obtained dope in the same manner as in Example 1.
(Evaluation of cellulose acetate)

Cellulose acetate used in Examples 1 and 7 to 9 were examined according to the testing methods of (1) acetic acid content, (2) molecular weight distribution (Mw/Mn), (3) viscosity average degree of polymerization (DP), (4) concentrated solution viscosity ($\eta$: second), (5) crystallization exotherm ($\Delta Hc$) and (6) ratio of acetone extracted fraction (%). Further, the value of $\ln(\eta)$ was experimentally measured as the item of (15) from the results of the viscosity of (4). Furthermore, a preferred lower limit (16) and upper limit (17) of $\ln(\eta)$ were determined from the degree of polymerization (3) and the formula (2) defining the relation between the degree of polymerization and the concentrated solution viscosity.

The results are set forth in Table 4.

TABLE 4

| Test | | Examples | | | |
|---|---|---|---|---|---|
| No. | | 1 | 7 | 8 | 9 |
| (1) | % | 60.9 | 60.9 | 60.2 | 61.7 |
| (2) |   | 2.74 | 1.60 | 1.54 | 2.34 |
| (3) |   | 299 | 322 | 313 | 291 |
| (4) | $\eta$: second | 74.7 | 101.5 | 92.7 | 107.8 |
| (5) | J/g | 17.5 | 14.0 | 13.5 | 18.1 |
| (6) | % | 12.1 | 0.4 | 0.4 | 12.1 |
| (15) |   | 4.31 | 4.62 | 4.53 | 4.68 |
| (16) |   | 4.29 | 4.50 | 4.42 | 4.21 |
| (17) |   | 4.39 | 4.85 | 4.67 | 4.22 |

The dopes prepared in Examples 1 and 7 were stored in a thermostat at 45° C., and observed. The dope of Example 1 kept the uniform solution for 1 hour. After 5 hours, a phase separation was observed because of precipitation of cellulose acetate. On the other hand, the dope of Example 7 kept the uniform solution for over 240 hours.

EXAMPLE 10

At room temperature, 100 weight parts of cellulose acetate (average acetic acid content: 60.9%, viscosity average degree of polymerization: 299) was mixed with 385 weight parts of acetone and 15 weight parts of triphenyl phosphate (TPP).

The mixture was treated using water/ethylene glycol as the cooling medium (-30° C.) according to the cooling dissolution method in the same manner as in Example 1 to prepare a dope.

The dope was cast and dried in the same manner as in Example 1 to prepare a cellulose acetate film.

The cellulose acetate films was subjected to the testing methods of (8) equilibration water content, (9) tensile test, (10) tear test, (11) folding endurance test, (12) resistance to moist heat, (13) retardation (Re) and (14) haze.

The results are set forth in Table 5.

As is shown in Table 5, the cellulose acetate film prepared according to the present invention has excellent physical and chemical characteristics.

TABLE 5

| Sample No. | (8) % | (9) kg/mm² | (10) kg | (11) Times | (12) | (13) nm | (14) % |
|---|---|---|---|---|---|---|---|
| Ex. 10 | 1.7 | 280 | 24 | 150 | B | 17 | 2.0 |

Further, the results of Example 10 were compared with the results of Examples 1 and 6 (shown in Table 3). With respect to the resistance to moist heat, the film of Example 10 is rather inferior to the films of Examples 1 and 6. Accordingly, the films of Examples 1 and 6 are preferably used as an optical film, which requires strong resistance to moist heat.

On the other hand, the film of Example 10 as well as Example 6 has a small equilibration water content (8). Accordingly, the films of Examples 6 and 10 are preferably used in a technical field, which requires a dimensional stability to the change of moisture.

As is described above, an excellent cellulose acetate film can be prepared according to the present invention without use of methylene chloride.

We claim:

1. A process for the preparation of a cellulose acetate film which comprises the steps of:

cooling a mixture of cellulose acetate and an organic solvent to a temperature of -100° to -10° C., said cellulose acetate having an average acetic acid content in the range of 58.0 to 62.5%, said cellulose acetate being contained in the mixture in an amount of 10 to 40 wt %, and said organic solvent consisting essentially of acetone;

warming the cooled mixture to a temperature of 0° to 50° C. to dissolve the cellulose acetate in the organic solvent;

casting the obtained solution on a support; and evaporating the organic solvent to form the cellulose acetate film.

2. The process as claimed in claim 1, wherein the cellulose acetate has a viscosity average degree of polymerization in the range of 250 to 400.

3. The process as claimed in claim 1, wherein the cellulose acetate contains a low molecular weight fraction of not more than 10 wt. %, said fraction being soluble in acetone at 25° C.

4. The process as claimed in claim 1, wherein the cellulose acetate has a viscosity average degree of polymerization represented by DP and a concentrated solution viscosity represented by $\eta$ which satisfy the formula (2):

$$2.814 \times \ln(DP) - 11.753 \leq \ln(\eta) \leq 6.29 \times \ln(DP) - 31.469 \quad (2)$$

wherein DP means the value of a viscosity average degree of polymerization, which is not less than 290; and $\eta$ is a period of time in terms of second taken for a ball to pass between the standard lines measured according to a falling ball method.

5. The process as claimed in claim 1, wherein the cellulose acetate has a crystallization exotherm in terms of ΔHc in the range of 5 to 17 J/g.

6. The process as claimed in claim 1, wherein the mixture of cellulose acetate and an organic solvent further contains a plasticizer in an amount of 0.1 to 20 weight parts based on 100 weight parts of the cellulose acetate.

7. The process as claimed in claim 1, wherein the support on which the solution is cast has a surface temperature of not higher than 10° C.

8. The process as claimed in claim 1, wherein the cellulose acetate is contained in the mixture in an amount of 10 to 30 wt %.

* * * * *